United States Patent [19]

Redd et al.

[11] Patent Number: 6,106,753

[45] Date of Patent: *Aug. 22, 2000

[54] METHOD OF FORMING A BIODEGRADABLE MOLDED PACKING

[75] Inventors: Randall Vann Redd; Don Boyd Schiewetz, both of Wilmington, Del.; Donald Mark Cyron, New London Township, Pa.

[73] Assignee: Environmental Packing LP, Bridgewater, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/838,788

[22] Filed: Apr. 10, 1997

Related U.S. Application Data

[63] Continuation-in-part of application No. 08/791,120, Jan. 30, 1997, abandoned, which is a continuation of application No. 08/525,329, Sep. 8, 1995, abandoned.

[51] Int. Cl.[7] .......................... B29C 51/42; B29C 51/12; B29C 43/18; B29B 15/10
[52] U.S. Cl. ........................ 264/112; 264/113; 264/264; 264/321; 264/322; 264/279.1; 264/279; 264/121
[58] Field of Search .................................... 264/109, 117, 264/122, 321, DIG. 7, DIG. 14, 322, 112, 113, 264, 271.1, 279, 279.1; 426/453; 53/472, 474, 440, 122, 428, 121

[56] References Cited

U.S. PATENT DOCUMENTS

| | | |
|---|---|---|
| 3,137,592 | 6/1964 | Protzman et al. . |
| 4,588,638 | 5/1986 | Dolinar . |
| 4,644,733 | 2/1987 | Dolinar . |
| 4,673,438 | 6/1987 | Wittwer et al. . |
| 4,863,655 | 9/1989 | Lacourse et al. . |
| 5,095,054 | 3/1992 | Lay et al. . |
| 5,300,333 | 4/1994 | Wilkerson et al. . |
| 5,316,149 | 5/1994 | Tate .......................................... 206/584 |
| 5,360,892 | 11/1994 | Bonsignore et al. .................... 528/354 |
| 5,405,564 | 4/1995 | Stepto et al. ............................ 264/115 |
| 5,413,855 | 5/1995 | Kolaska et al. . |

FOREIGN PATENT DOCUMENTS

| | | |
|---|---|---|
| 0 667 369 A1 | 1/1995 | European Pat. Off. . |
| WO/94/10063 | 5/1994 | WIPO . |

*Primary Examiner*—Jan H. Silbaugh
*Assistant Examiner*—Kenneth M. Jones
*Attorney, Agent, or Firm*—Laurelee A. Duncan; Karen G. Kaiser, Esq.

[57] ABSTRACT

A method for making shaped articles at room ambient temperatures without the addition of extraneous heat comprising the sequential steps:

(1) forming a plurality of particles comprising a foamed admixture of starch, biodegradable polymer and water;

(2) at room ambient temperature, applying to the surface of the particles finely divided drops of unheated water to effect wetting and softening of the outer surfaces of the particles;

(3) without the addition of heat, compressing the surfaces of the surface softened particles to effect cohesion between the wetted outer surfaces of the particles, densification of the particles and formation of a shaped article; and (4) without the addition of heat, maintaining the particles under such compression for a time sufficient to render the outer surface of the particles nontacky by adsorption of water into the particles and by evaporation of water from the surface of the particles and (5) forming a protective skin on the outer surface of the compressed, non-tacky particles by heating the walls of the mold cavity and thus melting the outer surface of the shaped article having contact with the walls of the mold parts.

15 Claims, 3 Drawing Sheets

METHOD OF FORMING A BIODEGRADABLE MOLDED PACKING

CROSS REFERENCE TO RELATED APPLICATIONS

This application is a continuation-in-part of U.S. patent application Ser. No. 08/791,120, filed Jan. 30, 1997, now abandoned which is a continuation of U.S. patent application Ser. No. 08/525,329, filed Sep. 9, 1995, now abandonded.

FIELD OF THE INVENTION

The invention is directed to biodegradable molded packing and to a method for making such packing. In particular, the invention is directed to biodegradable molded packing which is based on starch as the primary component.

BACKGROUND OF THE INVENTION

Expanded packing products, which are hardened foams, enjoy widespread use as loose-fill packing material. Loose-fill packing based on polystyrene constitutes a major market for expanded foam packing products. Such plastic foams have several drawbacks however. Firstly, their methods of manufacture are complex and therefore expensive. Secondly, the expansion (foaming) step in their manufacture involves a blowing agent, such as pentane, which presents a fire hazard or a chlorofluorcarbon, which is environmentally unacceptable unless a still more costly hydrofluorocarbon alternative blowing agent is used instead. Furthermore, although such packing can be formulated (at added cost) to be degradable in direct sunlight, it still suffers from the serious disadvantage that it is not biodegradable or hydrolytically degradable under the environmental conditions that prevail in compost heaps, landfills, or other common disposal means.

U.S. Pat. No. 3,137,592 to Protzman discloses heating a mixture of starch and water to 125–250 C under pressure sufficient to maintain the water in the liquid state and then relieving the temperature and pressure in an extruder.

U.S. Pat. No. 4,588,638 and U.S. Pat. No. 4,644,733 to Dolinar are directed to expanded loose-fill packing comprising polymer particles (e.g. polyethylene) in which "at least a portion" of the surface of "a majority of the particles" are coated with an adhesive (such as glue, polymer latex or "starch-based adhesive") to reduce migration of the particles in use. The patents also disclose a method of packing articles in containers with such polymeric loose-fill particles.

U.S. Pat. No. 4,673,438 to Wittwer discloses injection molding starch-water mixtures which have been heated to a temperature above the $T_g$ and melting point of the composition. The water content of the mixture is maintained throughout the molding process.

Lacourse et al. U.S. Pat. No. 4,863,655 discloses a biodegradable packing material comprising an expanded high amylose starch prepared by extruding the starch in the presence of up to 21% moisture. High amylose starch is, of course, quite expensive.

U.S. Pat. No. 5,300,333 to Wilkerson et al is directed to moldable mixtures comprising expanded grains such as popcorn, which are dispersed in a continuous phase of biodegradable bonding agent, such as starch paste.

U.S. Pat. No. 5,413,855 to Kolaska et al is directed to molded bodies comprised of expanded beads of starch, poly(vinyl alcohol) and water which are placed in a closed mold and then heated with low humidity air or dry steam to dissolve the surface of the beads and make the beads stick together.

U.S. Pat. No. 5,095,054 at Lay et al. is directed to the manufacture of shaped articles by extruding a material comprising a destructurized starch and any of several classes of organic polymers and copolymers such as modified polysaccharides, poly(vinyl pyrrolidone), cationic and anionic starches, poly(vinyl acetate) polymers and copolymers and the like. The polymers are added for the purpose of increasing stability, stiffness, elasticity, etc., of the shaped articles.

While the use of loose-fill packing of the kind described above has been widely accepted, such environmentally friendly packaging has not been available for the manufacture of molded packaging shapes, such as those which are used to package electronic components and other fragile items. Heretofore, such molded packing shapes have largely been made from non-degradable synthetic polymeric materials such as polystyrene.

SUMMARY OF THE INVENTION

The invention is therefore directed in a first aspect to a method for making shaped articles at room ambient temperatures without the addition of extraneous heat comprising the sequential steps:

(1) forming a plurality of particles having a density of 0.003–0.03 g/cc comprising a foamed admixture of starch, biodegradable polymer and water, the size of the particles being from 1 to 50 mm;

(2) at room ambient temperature, applying to the surface of the particles finely divided drops of unheated water to effect wetting and softening of the outer surfaces of the particles;

(3) without the addition of heat, compressing the surfaces of the surface-softened particles to effect cohesion between the wetted outer surfaces of the particles, densification of the particles and formation of a shaped article; and (4) without the addition of heat, maintaining the particles under such compression for a time sufficient to render the outer surface of the particles non-tacky by adsorption of water into the particles and by evaporation of water from the surface of the particles, the amount of water in step (2) being adjusted to render the outer surface of the particles non-tacky within 5 minutes after initiating the application of compression to the particles in step (2).

The invention is further directed to a method of pre-molding shaped articles at room ambient temperature without the addition of extraneous heat using a plurality of particles comprising a foamed admixture of starch, thermoplastic biodegradable polymer and water, the method comprising the sequential steps of:

(1) at room ambient temperature, applying to the surface of the particles finely divided drops of unheated water to effect wetting and softening of the outer surfaces of the particles;

(2) without the addition of heat, dispensing the surface wetted particles into a first mold section having a first predetermined shape;

(3) without the addition of heat, compressing the surface softened particles within the first mold section with a second mold section having a second predetermined shape; and (4) without the addition of heat, maintaining the compression for a time sufficient to render the outer surfaces of the particles non-tacky by adsorption of the water into the particles and by evaporation of the water from the surface of the particles.

In a third aspect, the invention is directed to shaped articles suitable for packing which are comprised of an agglomerate of cohesive particles of a foamed composition of starch and water-soluble polymer.

BRIEF DESCRIPTION OF THE DRAWING

The Drawing consists of three sheets comprising FIG. 1, FIGS. 2a–e, and FIGS. 3a–e. All three figures are schematic representations of the equipment and procedure used for carrying out the invention. As is explained hereinbelow, potato starch is a particularly preferred starch component because of its superior properties for the adsorption of water when used in accordance with the invention.

DETAILED DESCRIPTION OF THE INVENTION

Figure 1:
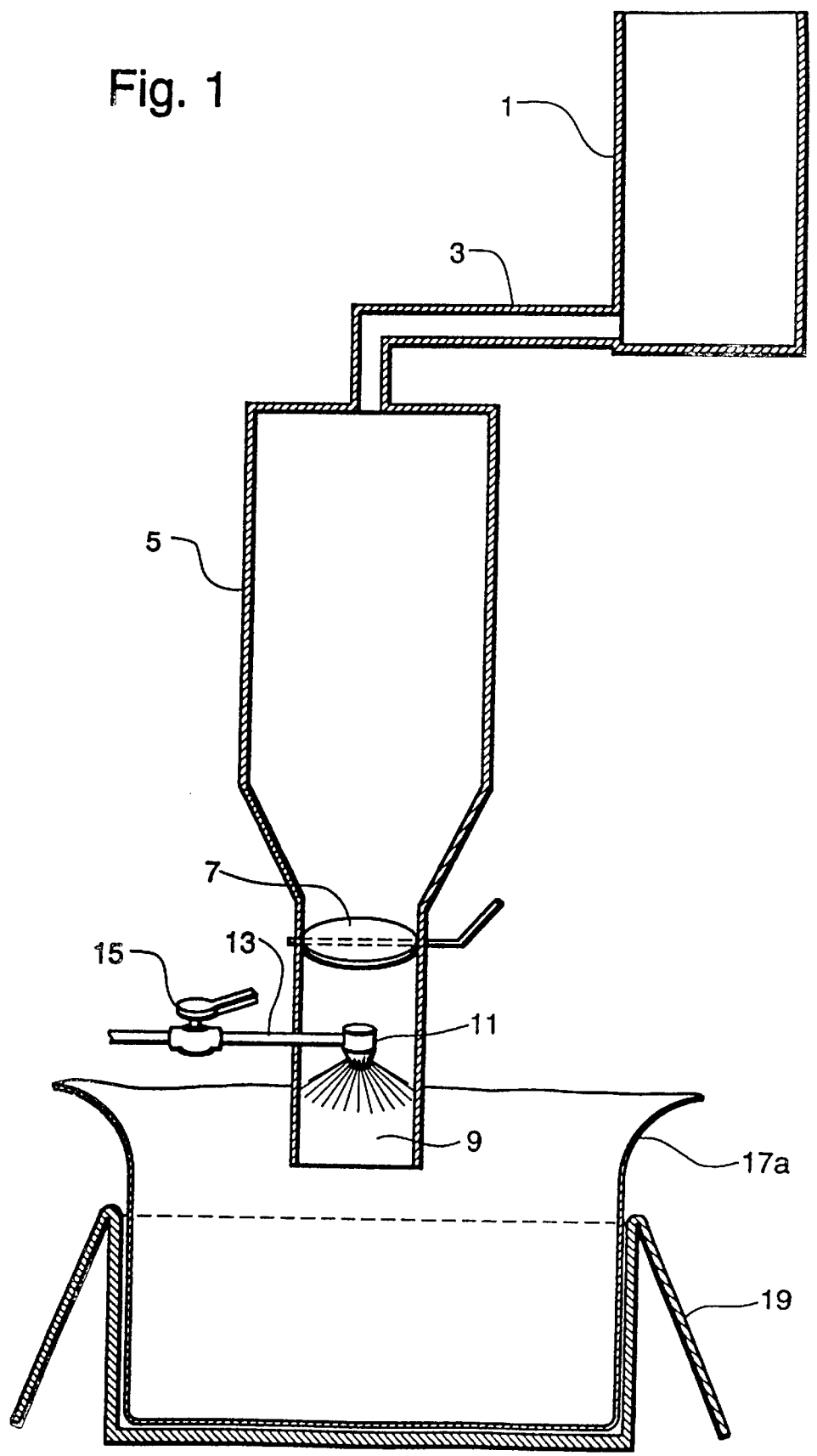

Starch Component:

The starch/polymer composition which can be used in the invention can utilize starch derived from any source so long as it is gelatinizable by the application of heat and pressure. Accordingly, the starch can be derived from purified, industrial grade starch or from unpurified, natural starch or even from starch fractions. Thus, unmodified and modified potato, wheat, tapioca, rice, corn, sago starches and mixtures thereof may be used. In addition, genetically modified starches in which the ratio of branched and unbranched chains has been altered can also be used so long as they are gelatinizable under the temperature and pressure conditions characteristic of extruder operation. In this regard, high amylose corn, which is comprised of straight chain starch molecules, would not be preferred because it is difficult to gelatinize even in boiling water. The data in Table 1 below reveal the operating variables which yield a constant level of shrinkage of the formed shapes using different starch compositions.

Polymer Component:

A wide variety of polymers, including copolymers, may be used in conjunction with the above-described starch composition so long as they are biodegradable. In addition, these polymers must be both thermoplastic and dispersible in water. Water-soluble polymers, such as poly(vinyl alcohol) are preferred. However, mixtures of water-dispersible polymers and minor amounts of water-insoluble polymers can be used. Such polymers are disclosed in U.S. Pat. No. 5,095,054 to Lay et al. and include the following classes:

(1) Multifunctional polymers at least one functional group of which is hydroxyl;
(2) Multifunctional polymers at least one functional group of which is carboxyl;
(3) Polymers containing tertiary or quaternary amino groups or salts thereof;
(4) Modified polysaccharides containing hydroxyalkyl, alkyl ether or ester groups;
(5) Copolymers of vinyl pyrrolidone;
(6) Cationically modified polysaccharides;
(7) Anionically modified polysaccharides;
(8) Copolymers of vinyl esters and non-function monomers in which the ester group is hydrolyzed;
(9) Polysaccharide graft copolymers;
(10) Poly(alkylenimines) and copolymers thereof;
(11) Styrene sulfonic acid polymers and copolymers; and
(12) Carboxylic polymer and copolymer salts.

Mixtures of water-soluble and water-insoluble polymers may be used.

Because of its low price and superior physical properties, the preferred water-soluble polymer for use in the invention is poly(vinyl alcohol). So long as the poly(vinyl alcohol) [PVA] is water soluble, the degree of hydrolysis of the polymer is not a critical variable. Most available grades of PVA are, however, at least 88% hydrolyzed and frequently are at least 93% hydrolyzed. For use in the invention, it is preferred that the polymer be supplied in granular form so that it can be easily mixed with the water-soluble polyhydric compound. From 2–20% by weight PVA, basis total composition, is ordinarily needed in the invention with 12–18% weight being preferred.

As used herein, the term "water soluble" refers to solubility of the polymer in unheated water such as tap water or water at ambient or room temperature.

Other Components:

The biodegradable starch-polymer mixtures for use in the invention can and will usually contain small amounts of additives such as lubricating agents, nucleating agents and the like. Talc, fumed silica, silica and the like can be used as nucleating agents for the invention. Suitable lubricating agents include such materials as poly(ethylene glycol), hydrogenated and nonhydrogenated vegetable oils, substituted and unsubstituted fatty acids, soaps and greases. The total of such additives will not usually be more than about 5%, basis combined weight of the starch and polymer.

Loose-fill Particle Manufacture:

The loose-fill packing for use in the invention is preferably made from an admixture of biodegradable starch and water-dispersible biodegradable polymer in the following range of concentrations on a dry basis:

Starch 80–90% wt. (preferably 82–88% wt.)
Biodegradable polymer 20–10% wt. (preferably 18–12% wt.)

The ingredients are easily mixed by adding them to a low-shear mixing device such as a ribbon or paddle mixer. It is preferred that the dry components be blended first, after which, water is added. The amount of water added relative to the weight of dry components will be varied according to the desired density of the particles. The amount of water added is typically on the order of about 12% wt., basis dry components for most loose-fill packing.

The loose-fill particles from which the molded packing of the invention is made are formed by extrusion of the starch/polymer mixtures using conventional single or twin-screw extruders which can have one or more die heads. For the purposes of the invention, it is preferred that the extruder be operated at a die pressure of 500–3000 psi (35–211 kg/cm$^2$), a die temperature of more than 250 F (121 C) and residence time of no more than one (1) minute, and preferably less than thirty (30) seconds.

It is recognized that, as the extrudable composition is compressed within the extruder, its temperature may exceed the die temperature. However, so long as the residence time within the extruder is less than one (1) minute, there will be little thermal degradation of the composition and the foamed product.

In a preferred method of carrying out the extrusion operation, the water content of the extruded loose-fill packing is measured and the water content of the admixture entering the extruder is adjusted in accordance with the bulk density of the extruded product. It has been found that the amount of water in the admixture fed to the extruder should be about 20–25% by weight, basis starch solids. In many operations, it is desired that the bulk density of the extruded product be as low as possible and a suitable bulk density is specified for commercial scale production. If the bulk density is below the pre-selected value, the amount of water in the feed to the extruder is reduced. On the other hand, if the bulk density is above the pre-selected value or if the product is too friable, the amount of water in the feed is raised.

It is preferred that the residence time of the admixture within the extruder not exceed about one (1) minute and that the maximum temperature attained by the feed within the extruder not exceed about 220 C, lest some of the raw materials become excessively degraded by thermal decomposition. It will be observed that the maximum temperature within the extruder will normally be higher than the temperature at the die head and in some instances it may be desired to cool the jacket of the extruder. It is further preferred that the residence time within the extruder not exceed thirty seconds. It will be clear to those skilled in the art that the starch contained in the extruder feed undergoes gelatinization, but it is not necessary that the starch be destructurized in the manner taught in the Lay et al. Patent. Nevertheless, such destructurized starch/polymer mixtures may be used in the invention.

For most economical operation, the discharge from the extruder can be made directly to room ambient conditions. Special cooling is not required to obtain rapid solidification at room temperature.

It is preferred in the practice of the invention that the loose-fill particles have no dimension smaller than about 1 mm and preferably at least 3 mm. On the other hand, it is preferred that the maximum dimension of the particles be no larger than about 50 mm. Particles which are roughly cylindrical in shape having a diameter of about 30 mm and a length of about 15–20 mm are preferred because they have superior densification and packing characteristics. Cylindrical shapes are, of course, conveniently produced in the formation of foamed particles by extrusion. Though cylindrical shapes have been found to be advantageous, irregular shapes and other regular shapes can also be used, such as spheres and ellipsoids.

Application of Wetting Liquid:

It is important that the surfaces of the particles be uniformly wetted. In particular, if not all particles are wetted, the material will not cohere properly and the shaped article will fall apart. Conversely, if some particles are wetted more than others, non-uniform shrinkage will result and the shaped article will be deformed. As such, it is essential the liquid be uniformly applied to all of the particles.

A distinct advantage of the invention is that it does not require the addition of heat at any stage of the process. In fact, the addition of heat may be detrimental if it excessively speeds up both the adsorption of the wetting liquid into the particles as well as the rate of evaporation of wetting liquid from the surfaces. Thus, the interval of time during which proper cohesion of the particles can be achieved as they undergo compression is reduced excessively. On the other hand, cooling of the wetting liquid is not preferred since the wetting and softening of the packing surfaces becomes too slow. Thus, for maximum efficiency, the method of the invention should be carried out at temperatures ranging from about 20 to about 45 C, or in other words, at room ambient temperature.

The method of applying liquid to wet and soften the surface of the particles of foamed starch polymer admixture is not difficult. For example, the liquid can be applied by dispersing the particles in air and spraying the liquid onto the dispersed particles. It can also be applied by dropping the particles through a spray of fine droplets of the wetting liquid. The particular method of applying the liquid is not critical so long as a substantial amount of the particle surfaces are wetted and the particle surfaces are wetted uniformly. When the particle surfaces are treated with water, the water on the surface tends to be removed rapidly from the surface by adsorption into the particle and by evaporation into the atmosphere. Therefore, it is preferred to subject the particles to molding promptly after the surfaces are treated with water. For this reason, it is preferred that the wetting operation as well as the molding operation be carried out at room ambient temperatures and that no heat be applied either to the particles or to the wetting liquid.

Formation of the Shaped Article:

Molding of the shaped article can be carried out in a number of ways, which can be divided into two classes: in-situ and premolding. In both classes the determinant of the cushioning properties of the final product is the degree to which the wetted material is compressed. Compression ratio is frequently used to quantify this, and is defined as the initial material dimension (measured parallel to the axis of compression) divided by the final material dimension. The greater this ratio, the greater the density of the final cushion and, therefore, the lower the force transmitted to the packaged object. This ratio and the desired dimensions of the shipping container are used in determining the amount of wetted material used in forming the cushion. However, the preferred compression ratio is about 1.3, which is similar to the properties of conventional foam-in-place urethane materials.

In situ molding:

This molding technique involves forming the cushion using the object to be packaged and its shipping container. This technique is preferred because it allows for just-in-time fabrication of packages, thus eliminating the need to warehouse multiple packaging products and shaped cushions to accommodate the various sizes and shapes of the packaged objects.

The methods used to create this type of cushion generally have three steps: (1) formation of a lower cushion by placing cushioning material into a container, (2) creating an impression of the object to be cushioned in the lower cushion, and (3) formation of an upper cushion on top of the object. It is not necessary to apply additional processing, such as heat or additional adhesive applications, to insure that the mold maintains its integrity.

A specific example of this process is a dispensing quantity of wetted foamed material in the bottom of the shipping container. The dispensing apparatus automatically adds water to the surface of the individual foamed particles in a controlled manner as they are transported from a storage location to the container. The degree of wetting must be carefully controlled as too little water will reduce the integrity of the cushion by allowing loose particles, and too much water will cause the pellets to shrink excessively and therefore affect the properties, dimensions, and aesthetics of the final cushion. Experience has shown that the correct amount of water is reached if the wetted particles become non-tacky within 5 minutes, preferably within 2 minutes.

Once the container is partially filled with wetted material, it may be covered by a layer of flexible film, after which the object to be packaged is placed on top. The object is then gently pushed down into the material and manipulated by hand to nestle it into a secure position within the material. Another layer of film may be added and then additional wetted material dispensed into the container atop the second film. The container is slightly overfilled, by which the upper layer of material is compressed when the container is closed. This molds the upper cushion in the shape of the upper side of the object and creates a solid protective cushion around the object.

Optionally, the wetted material may be placed in a bag instead of using film. Alternatively, the object may be wrapped in film or bag and placed in between the cushions.

While the use of bags, film, or wraps is optional, it is preferred in order to create a barrier between the cushioning material and the object. This improves the aesthetics of the object by preventing the wetted material from sticking to the object as well as facilitating the separation of the cushions when the object is removed.

When a film, bag or wrap is used it can be made of any material, or combination of flexible sheet materials, but it is preferred that it be made of materials that render it biodegradable. Poly(lactide) and poly(vinyl alcohol) are particularly useful in this application; but paper, poly(caprolactone), poly(ethylene vinyl alcohol), and chemically and/or genetically modified corn starch can also serve well.

Premolding:

The premolding technique involves creating a molded part that in final form is used similarly to conventional molded materials. This may be preferred in situations where, in order to improve efficiency of packaging or labor utilization, the molding of the cushions occur separately from the packaging of the object. The final result is equivalent to an in-situ method in terms of protective properties. One additional concern with this process is making a mold that can withstand the handling required in manufacturing and transportation before it is placed in the shipping container.

This embodiment entails three key steps: (1) filling of a cavity mold section (the portion of the mold with the largest internal dimensions) with wetted material, (2) controlled compression of the material using a complementary mold section pushing against the material in the cavity mold section, and (3) removing the finished piece from the mold assembly. As described above, an optional additional step is to form or wrap a "skin" or rigid surface layer on the finished piece to lessen the chance of surface damage during handling and use.

There are many possible variations in construction of the mold and in the details of the process, as would be apparent to anyone familiar with part molding techniques, but the process and equipment described below are typical.

A cavity mold section is prepared to form a cushion of the desired dimensions. This typically requires the inside dimensions of the mold to be slightly larger than the final cushion to insure a tight fit in the shipping container and around the part. Preferably, the mold is 1 to 2 centimeters larger in each dimension than the final cushion. It is preferred that the cavity mold be used to produce the flat sides and bottom of the cushion that contact the sides of the container, rather than the top surface into which the object is nested. It may also be preferred that the dimension of the cavity mold section perpendicular to the axis of travel of the male mold section to be significantly larger than the final cushion in order to allow space for the addition of a sufficient amount of wetted material to form the cushion. It is preferred that this dimension be 1.5 to 2.5 times this dimension in the final cushion, but the properties required in the final cushion may require significantly more space. It is also not necessary for this dimension of the cavity section to be exactly the volume of material added prior to compression as the degree of filling is controlled by the molder.

This top surface, including the shape of the object, is preferably formed by causing the second section of the mold to contact the material contained in the cavity section and compressing the material to the desired level. The male mold section is shaped to simulate the object in the portion that contacts the top surface of the cushion. The male mold section may also have to be slightly oversized to allow proper fit, but in some cases may be sized so it fits inside the female mold. An alternative embodiment is to form the shape of the object in the bottom of the female mold section and use the male section to form the bottom of the cushion.

Typically there will be two separate premolded parts for each package: a top and bottom cushion. If the object to be packaged is symmetrical and the container is symmetrical, then both cushions may be formed from the same mold. However, in many cases this will not be possible and separate molds will have to be constructed for each. A logical way to accomplish this would be to create two or more molds as one unit so that more than one cushion and/or more than one type of cushion could be formed at the same time.

The molds may be made out of any rigid material, such as wood, metals, or plastics. Wood and plastic are typically preferred because of their low cost.

Movement of the mold sections relative to each other may be controlled in a variety of ways. A typical arrangement is to attach the female section to a flat surface and position it under the male section, which is attached to a the movable shaft. This shaft, operated by hand, hydraulic pressure, or other source of power is used to move the male section down to contact and compress the wetted material in the female section. The amount of travel, and thus the extent to which the material is compressed, is controlled to achieve the desired dimensions and properties in the final cushion. This control can be accomplished in a variety of ways, from simple manual operation or the use of sophisticated computer-controlled equipment.

The wetted material used to form the cushion is dispensed into the mold section using the same principles as described for in-situ molds: a system to transport the pellets from a storage location through a device that causes a controlled quantity of water to be added evenly to the surface of the pellets, and then to be transported without pause into the mold section.

In the preferred method, the female section is filled with wetted particles to about twice the height of final cushion and the male mold is pressed against the particles until the desired degree of compression is achieved. The male section is then removed and the finished part is removed from the female section. It is then ready for use. Compression time, which is defined as the time from first contact with the surface of the wetted material to removal of the male mold section, is typically less than one minute and preferably less than 30 seconds.

The finished premolded part may be further treated to form a rigid "skin" on its surface. This has the advantages of improving the aesthetics of the final part and minimizing the loss of individual particles from the surface during handling and use. However, this step is not necessary to producing a fully functional, useful part. A surface treatment may also be used in the way film, bags, or wrap is used in the in-situ method as a way of keeping the cushions isolated from each other and from the packaged object. This "skin" can be formed in several ways, but most involve placing a wrap around the outside of the finished cushion.

Commercially available products such as shrink wrap (oriented polymer film that dramatically changes dimension when heated) and stretch wrap (oriented polymer film that is mechanically pulled tightly around a packaged object) are options. Other packaging methods include manually wrapping with polymer film, enclosing the cushion in a bag, or spraying the surface with a coating such as paint of latex emulsion. If a wrap is used, it is preferred that it be biodegradable, as discussed above. The wrapping material can be placed in the mold before compression to form a tight film around the outside of the compressed cushion. The wrapping material can also be placed in the mold after formation of the compressed cushion to form a tight film around the surface of the packaged object. Stretching the film can be done manually, or by use of heat, vacuum, or mechanical force. An example would be to use vacuum or air pressure to pull the film tightly around the finished part, after which it can be sealed by heat or an adhesive.

Another method to produce a skin takes advantage of the low melting point of some of the materials that can be used to make the foamed pellets. A mold constructed of metal and equipped with a method to heat the walls rapidly would, during the normal course of the compression cycle, partially melt the outer surface of the final cushion so that, upon cooling, it functions as a wrap. The contact time is short enough that melting occurs in only the first few millimeters of the cushioning material and thus does not contribute to the integrity of the cushion.

Protective "Skin" formation:

After cohesion of the particles and formation of a shaped packing form therefrom, aesthetic and handling qualities can optionally be improved by forming a protective "skin" around the outer surface of the shaped article. This can be accomplished in a variety of ways, including melting of the outer surface of the shaped article to form a natural "skin", or by surrounding the article with an artificial "skin".

A natural "skin" can be formed on the outer surface of the shaped article by melting the outer surface. This is generally accomplished by heating the outer surface of the shaped article. In a preferred embodiment, when using the pre-mold method of the invention, the walls of the mold cavity are heated prior to adding the wetted particles thereto. When the wetted particles are dispensed into the molded form and compressed into a shaped article, the heated walls help form the natural "skin" around the outside of the shaped article. The heating of the walls does not in any way affect proper cohesion of the particles, but merely assists in forming a natural "skin" onto the outside surface of the shaped article. It must be kept in mind that the formation of the natural "skin" is only possible when the particles comprise a biodegradable polymer. If there is no biodegradable polymer in the particle (i.e. the particle solely comprises starch), then the particle will burn. The preferred range of temperatures at which to heat the walls of the molded forms is 100–200 F (38–93 C). As noted hereinabove, the non-starch polymer must be both thermoplastic and biodegradable.

Instead of forming a natural "skin", an artificial protective "skin" can be placed around the shaped article. This is accomplished by wrapping a biodegradable or non-biodegradable wrap around the molded article. For example, a standard shrink-wrap can be wrapped around the shaped article and then shrunk for a snug fit over the article. Other methods of wrapping the article to form an artificial "skin" are contemplated.

Shrinkage of Formed Shapes:

A serious problem often experienced in the manufacture of foamed shapes made from starch/polymer mixtures is dimensional shrinkage which takes place after the shape is formed and the shipping article is in place for shipment. When such shrinkage occurs, the packed article becomes less rigidly confined by the packing during shipment. In some cases, the packed shipping article may even undergo damage from such movement. This shrinkage is believed to result from the tendency of starch to be dispersed by the water or even to be dissolved by the adsorbed water contained in the matrix of the formed packing. The dissolution of the starch then results in destruction of the starch-polymer matrix of the packing with a concomitant reduction in the dimensions of the packing.

Surprisingly, it has been found that this phenomenon is a function of both the quantity of starch in the formulation and the type of starch used. In particular, it has been found that various starches have different capability of adsorbing water and thus the shapes formed therefrom have different water shrinkage characteristics. However, with a given concentration of starch in the formulation, it has been found that potato starch is far superior to other starches in its greater ability to adsorb water without dissolution of the starch-polymer matrix. For this reason, it is preferred that potato starch be used as the starch component of the packing of the invention.

Ideally, 100% potato starch is used to minimize shrinkage due to water. However, potato starch is on the order of two times more expensive than many other starches. Nevertheless, lesser amounts of potato starch in the starch component can be used to reduce shrinkage where the problem is not so serious. For example, as little as 30% wt. potato starch can be used to reduce shrinkage significantly without adding substantially to the cost of such packing.

DETAILED DESCRIPTION OF THE DRAWING

In the following detailed discussion of one embodied method of the invention, the loose-fill packing used was based on a mixture of potato starch, wheat starch, poly (vinyl alcohol), talc, hydrogenated vegetable oil and water. The components were mixed together in a ribbon blender and fed to a twin-screw extruder in which they were formed into cylinders having a length of about 30 millimeters ("mm") and a diameter of at least 15 mm and a density of about 0.022 grams per cubic centimeter (g/cc).

A preferred method for carrying out the invention is illustrated by FIG. 1 of the Drawing. Dry loose-fill packing as described hereinabove is passed from storage silo 1 through fill line 3 into dispensing hopper 5, the outlet of which is fitted with a flapper valve 7 for gravity release of the dry packing into spray chamber 9. The spray chamber 9 is fitted with a spray nozzle 11. Unheated water is supplied through water line 13 in which the flow rate of the water is controlled by valve 15. It is preferred that the water spray be directed radially and/or downwardly in order to avoid wetting the sides of the spray chamber 9 above the water spray and the lower end of the dispensing hopper 5. This configuration of the spray significantly reduces the possible problem of loose-fill particles sticking to the sides of the spray chamber 9 during spray operation. When operation of the spray is begun, it is preferred that the water valve 15 and flapper valve 7 be opened simultaneously. The loose-fill particles falling through the water spray and through the lower end of spray chamber 9 fall directly into an open biodegradable bag 17a which is placed in the bottom of open shipping container 19, having top lid flaps which are opened. (See FIG. 2a) When sufficient particles have been placed in the bag 17 for bottom protection of the article, the spray and flow of particles are both terminated and the bag is closed by folding the open end of the bag. (See FIG. 2b) The article to be shipped 21 is placed on top of the bag 17 containing the loose-fill packing, leaving a space between the inside walls of the container 19 and the outer side surfaces of the shipping article 21. When the article to be shipped is of sufficient weight, further compression is not needed. However, if the article 21 is insufficient by its own weight to compress the wetted loose-fill in the bag, a slight pressure can be applied manually to the bag 17a by pressing down on the placed shipping article (See FIG. 2c).

A second biodegradable bag 17b is then placed atop the article being shipped and in the space between the container and the shipping article with the top of the bag opened upwardly. The water supply valve 13 and the flapper valve 7 are again opened simultaneously to transfer surface-wetted loose-fill packing into the second bag 17b and thus provide surface-wetted loose-fill particles in the space surrounding and on top of the article to be shipped 21. An amount of loose-fill particles is provided sufficient to fill the space surrounding the article to be shipped 21 and to overfill the container 19, i.e. to fill the container above the top level of the shipping space of the container 19. The overfill of particles is contained by the bag 17b. (See FIG. 2d) The lid flaps are then closed, by which a compressive force is exerted on the particles and the wetted particles in the second bag 17b are cohesively joined. (See FIG. 2e) So long as the water content of the particles is carefully controlled (i.e. by use of formula A or B), the surface of the particles becomes non-tacky within a few minutes after the particles are compressed as the water on the surface of the particles is adsorbed into the particles and/or is evaporated from the surface of the exposed surfaces of the particles. A separate drying step is not ordinarily required.

Figure 2:
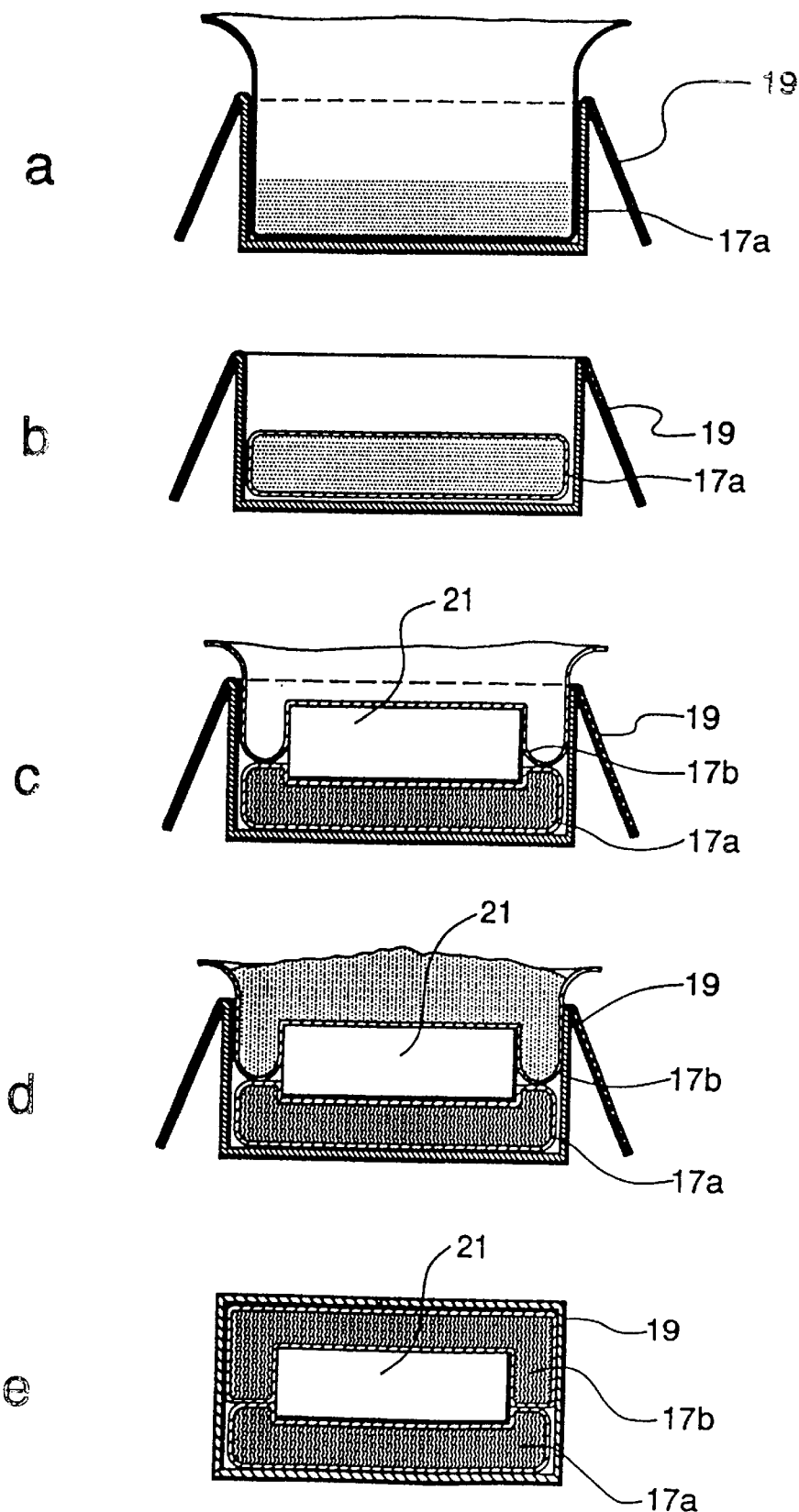

The foregoing procedure is directed to a convenient method for making molded packing in situ, as illustrated in FIGS. 1 and 2 of the Drawing. However, in many instances it will be preferred to make molded packing in advance of its intended use. For example, it will often be useful to make several sets of molded packing in anticipation of shipping many identical items. This premolding method of utilizing the invention is described below.

Figure 3:
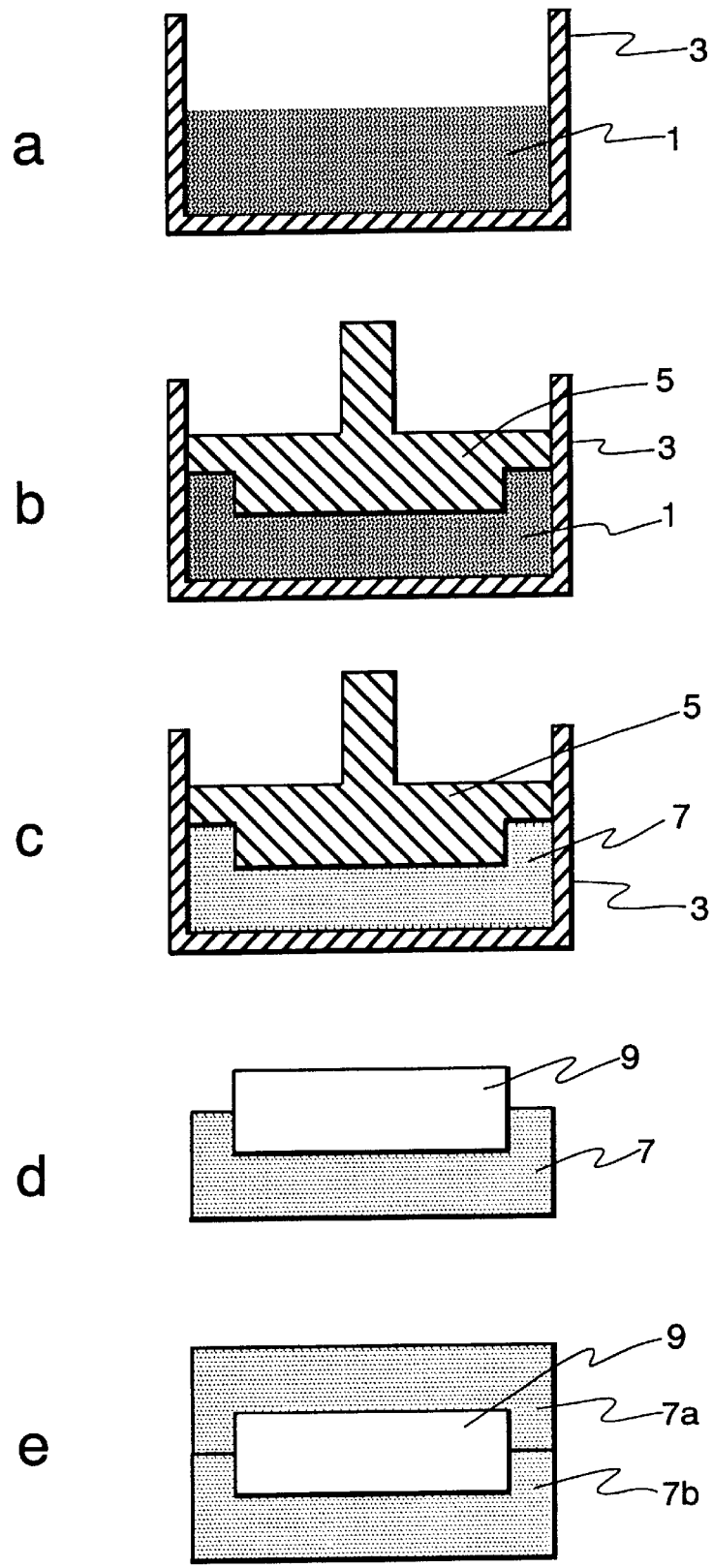

Referring now to FIG. 3 of the Drawing, this mode of forming molded packing for future use is illustrated with respect to a solid object having a circular cross section in which symmetrical mold sections can be used to protect the object to be shipped, as follows:

As shown in FIG. 3a, a measured quantity of water-moistened packing particles 1 is placed into the bottom of mold section 3, it will also be recognized that the packing particles can be placed in a biodegradable bag before placement in the bottom of mold section 3. Complementary mold section 5 is then pressed downwardly onto the upper surface of the particles, by which the particles conform with the facing surfaces of the two mold sections 3 and 5 and with the sides and bottom of mold section 3. (FIG. 3b) As shown in FIG. 3c, the downward pressure on the particles is maintained for a time sufficient to render the surface of the outer particles touching the mold faces non-tacky by adsorption of the water from the surface of the outer layer of particles and by evaporation of water from the particles having direct contact with the mold sections 3 and 5. When the particles having direct contact with the mold sections have become non-tacky, mold section 5 is removed and the molded packing 7 is removed from mold section 3. (FIG. 3d) This procedure is then carried out a second time and the item to be shipped 9 is placed within the cavity formed by the two facing molded packing shapes 7(a) and 7(b). (FIG. 3e)

If, as described above, the molded packing shapes are symmetrical, only one two-part mold is needed and the above described molding procedure is carried out twice to produce a second packing section. If the molded packing shapes are not symmetrical a second complementary mold will be needed.

In the above-described operations, if the bags or sheets containing the molded packing are not biodegradable, they should be recycled or disposed of in accordance with local regulations. However, the loose-fill packing itself, which is biodegradable, may be disposed of by composting or merely allowing it to be decomposed on or in the ground. Suitable biodegradable materials for the bags or sheets include poly (lactide), poly(ethylene vinyl alcohol), polycaprolactone, and poly(vinyl alcohol). Cellulosic materials, such as methyl hydroxy propyl cellulose, can also be used.

The combination of limited water addition by adsorption within the particles and compression of the particles serves to increase the density of the particles and also to increase the modulus of elasticity of the agglomerated particle mass. Thus, the molded packing made by the invention has an improved ability for the absorption of shocks which are often experienced in the handling and shipping of loaded cartons.

EXAMPLES

Example 1

A computer CPU measuring 1.5 ft×1.5 ft×0.5 ft (0.45 m×0.45 m×0.15 m) needs to be packed and shipped. The article is wrapped in polyethylene and prepared for shipment. The process used is that shown in FIG. 1. The shaped articles used to contain the computer CPU are made from loose fill packing material having a composition comprising 80% wt. wheat and 15% wt. poly(ethylene vinyl alcohol) (PVA). The material is 0.5 in (1.3 cm) in diameter and 0.75 in (1.9 cm) long.

The loose fill material is fed into a 54 ft$^3$ (1.5 m$^3$) hopper. Below the hopper is disposed a cylinder 8 in (20 cm) in diameter and 12 in (30.5 cm) in length. Disposed within the cylinder is an 8 in to 6 in (20 cm to 15 cm) reducing funnel. The funnel is located approximately 3 in (7.6 cm) before the bottom of the cylinder. Three nozzles (Spraying Systems Inc. M1.5) are located 1 in (2.5 cm) from the bottom of the cylinder. The same water supply system as used in example 1 was used here. The flapper valve is located just above the 6 in (15 cm) diameter portion of the funnel to control flow of particles.

A 12 ft$^3$ (0.34 m$^3$) polyethylene bag is placed under the bottom of the cylinder. A trigger located on the outside of the chamber is pulled and the flapper valve opens and the water begins to spray. The particles are fed at a rate of 10.5 ft$^3$/min. (0.3 m$^3$/minute) and the water is fed at a rate of 0.09 gallons per minute (gpm)(0.34 liters per minute). The bag is filled ¾ full and placed inside a 15.6 ft$^3$ (0.60 m$^3$) box. The bag is compressed into the corners of the box by hand. The CPU is placed on top of the bag and compressed into place. A second polyethylene bag is filled the same way. This bag is placed on top of the CPU and compressed into the voids and sides between the CPU and the box by hand. The box is closed and is now ready for shipping.

Example 2

Shaped packing is prepared, using the above-described pre-mold process, for the shipment of fiberglass cylinders. The cylinders are 59 in (150 cm) in length and 10 in (25 cm) in diameter. Both top and bottom premolded packing is required to protect the cylinders for shipping.

The pre-molded packing shapes are produced using the same loose fill material as Example 1.

A mold cavity was prepared having the following dimensions: 64 in (162 cm) by 17 and ¼ in (43.8 cm) by 16 and ½ in (41.9 cm). The cavity was constructed using ¾ in (1.9 cm) plywood with hinged sides to allow for easy removal of the shaped article after cohesion and formation. A mold insert was constructed which consists of a single ½ portion of the cylinder mounted on a ¾ in (1.9 cm) piece of plywood.

The surface of the loose fill material is wetted and fed into the mold cavity from a feeder assembly. The feeder assembly comprises a U-trough feeder being 4 feet ("ft") (1.2 meters ("m") in length. The feeder extends from an 8 ft by 4 ft 9 in by 8 ft frame (2.4 m by 1.4 m by 2.4 m) which is positioned 8 ft (2.4 m) above the ground. A 40 ft$^3$ (1.1 cubic meter) feed hopper, for containing all of the loose fill material, is disposed above the U-trough feeder. The feeder consists of an auger located inside the trough which conveys the material into a 6 in (15.2 cm) bottom opening. One end of a rubber hose, 6 in (15.2 cm) in diameter and 2 ft (61 cm) in length, is attached to the opening. At the opposite end of the hose is a 6 in (15.2 cm) to 3 in (7.6 cm) reducing metal funnel. Three nozzles (Hugo M1 nozzles from MC Master Carr) are attached to the end of the funnel and sit, equally spaced in a ring formation, 2 in (5.1 cm) below the bottom of the funnel. A handle with a trigger to control both the water and material flow rate is attached to the funnel at the dispensing end. The material is fed from the hopper into the feed funnel and then dropped through the ring of three equally spaced spray nozzles. The water is fed through the spray nozzles using a diaphragm pump which is controlled at 60 psi (4.2 ksc) pressure by a compressor. The trigger is pulled, the auger turns and the particles drop through the feed funnel at a rate of 2.8 ft$^3$/minute (0.08 m$^3$/minute). At the same time, the water begins to spray through the nozzles and forms a mist below the funnel. As such, the particles drop throughout the mist into the mold cavity. The water is sprayed onto the moving particles at a rate of 0.042 gallons/minute (0.16 liters/minute).

Once the mold cavity is filled to the top with the surface wetted material, the cylindrical mold insert is brought down on top of the wetted material and compresses the material, at a compression ratio of 2.1 to 1, to a level of approximately 8 to 10 in (20 to 25 cm) above the bottom of the female cavity. The compression is accomplished using two hydraulic cylinders (located 2 ft (61 cm) on either side from the center of the insert mold.) Once the shaped article is compressed, the pressure is held for approximately 10 seconds. The insert mold is then removed by reversing the hydraulic cylinders by which the mold pressure is released.

A second shaped article is produced in the same manner as just described. Once complete, the first shaped article is placed in the bottom of the shipping container for which it was pre-molded to conform to. The cylinders are then placed within their pre-molded positions within the first shaped article. Finally, the second shaped article is placed within the shipping container over the first shaped article and the cylinders. The cylinders are now contained within the pre-molded shaped articles.

To determine the effect of starch type on the tendency of foamed starch-polymer particles to shrink after treatment with small amounts of water, a series of cylindrical foamed particles was prepared in the manner of Example 1. The series was comprised of 38 samples in which the fixed variables were gallons per minute of water, cubic volume of the foamed particles and the relative amounts of wheat starch and potato starch in the particles. The measured dependent variable was the shrinkage of the cube formed therefrom. A given quantity of particles from each formulation was treated with various amounts of water to moisten the surface of the particles. The thusly surface-moistened particles were then compressed into a fixed uniform cubic shape. After compression, the cubes formed from the test particles were set aside under ambient laboratory conditions of temperature and atmospheric pressure for a period of 24 hours, at the end of which the dimensions of the cubes were carefully measured and compared to the dimensions of the mold. The data from this series were then subjected to multiple regression analysis in which the volume of water (gpm) was treated as the dependent variable and the starch composition and particle volume were treated as independent variables. The data from this analysis are presented numerically in Table 1 below.

TABLE 1

| | GPM REQUIRED FOR 2% SHRINKAGE | | | |
|---|---|---|---|---|
| ft$^3$/min. | 100% Potato | 100% Wheat | 90% Wheat | 60% Wheat |
| 1 | 0.027 | 0.019 | 0.017 | 0.019 |
| 2 | 0.050 | 0.033 | 0.031 | 0.036 |
| 3 | 0.073 | 0.046 | 0.044 | 0.053 |
| 4 | 0.095 | 0.060 | 0.058 | 0.070 |
| 5 | 0.118 | 0.073 | 0.071 | 0.087 |
| 6 | 0.141 | 0.086 | 0.084 | 0.104 |
| 7 | 0.164 | 0.100 | 0.098 | 0.122 |
| 8 | 0.187 | 0.113 | 0.111 | 0.139 |
| 9 | 0.209 | 0.127 | 0.125 | 0.156 |
| 10 | 0.232 | 0.14 | 0.138 | 0.173 |
| 12 | 0.278 | 0.1668 | 0.165 | 0.207 |
| 14 | 0.323 | 0.1936 | 0.192 | 0.241 |
| 16 | 0.369 | 0.2204 | 0.218 | 0.275 |
| 18 | 0.415 | 0.2472 | 0.245 | 0.310 |
| 20 | 0.460 | 0.274 | 0.272 | 0.344 |

The foregoing data shows that much larger amounts of water could be tolerated in the system before the shrinkage reached 2% if potato starch were substituted for wheat starch. In particular, the formulation containing all potato starch could tolerate up to about 68% more water than the compositions containing 90–100% wheat starch before exceeding 2% shrinkage. Moreover, even the formulation containing only 40% potato starch could tolerate about 12% more water than the compositions containing 90–100% wheat starch. Thus, the use of potato starch to replace wheat and other starches provides a much greater latitude at to formulations which can be used without incurring excessively high shrinkage of the formed packing.

What is claimed:

1. A method of pre-molding shaped articles at room ambient temperature without the addition of extraneous heat using a plurality of particles comprising a foamed admixture of starch, biodegradable, thermoplastic, water-dispersible polymer and water, the method comprising the sequential steps of:

(1) at room ambient temperature, applying to the surface of the particles finely divided drops of unheated water to effect wetting and softening of the outer surface of the particles;

(2) without the addition of heat, dispensing the surface-wetted particles into a first mold cavity;

(3) without the addition of heat, compressing the surface-softened particles within the first mold cavity with a complementary second mold section;

(4) without the addition of heat, maintaining the compression for a time sufficient to render the outer surfaces of the particles non-tacky by adsorption of the water into the particles and by evaporation of water from the surface of the particles, wherein the amount of water applied in step (1) is adjusted to render the outer surface of the parties non-tacky within 5 minutes after initiating compression on the particles in step (4); and (5) forming a protective skin on the outer surface of the compressed, non-tacky particles by heating the walls of the mold cavity and thus melting the outer surface of the shaped article having contact with the walls of the mold parts.

2. The method of claim 1 in which the starch is selected from potato starch, wheat starch, corn starch and mixtures thereof.

3. The method of claim 1 in which the biodegradable polymer is poly(vinyl alcohol).

4. The method of claim 1 in which the particles are dispersed in a gas or vapor and wetting liquid is sprayed into the dispersion.

5. The method of claim 4 in which the particles are dropped through a spray of wetting liquid.

6. The method of claim 1 in which the starch is destructurized.

7. The method of claim 1 in which the starch is gelatinized.

8. The method of claim 1 in which:

step (2) of claim 1 further includes, after the placing of some surface-wetted particles into a first mold cavity, placing an article for shipment atop the wetted particles to effect compression of the particles leaving a space between the outer sides of the article for shipment and the inner sides of the first mold cavity, then filling the space between the outer sides of the article for shipment and the inner sides of the first mold cavity and covering the article with wetted particles to a level rising above the sides and top of the article for shipment.

9. The method of claim 8 in which a thin flexible sheet of film material is placed atop, the particles in the bottom of the mold container before placement of the article to be shipped.

10. The method of claim 9 in which the film material is biodegradable.

11. The method of claim 10 in which the biodegradable film material is selected from the group consisting of poly(lactide), poly(ethylene vinyl alcohol), polycaprolactone and mixtures thereof.

12. The method of claim 10 in which the biodegradable film is made from a cellulosic material.

13. The method of claim 1 wherein the compression maintained on the surface softened particles is uniform.

14. The method of claim 1 wherein the compression maintained on the surface softened particles ranges from a nominal 10 psi to 600 psi (0.7 to 422 ksc).

15. The method of claim 1 in which the product of step (5) is shaped wrap to form a protective skin.

* * * * *